United States Patent
Christoph

(10) Patent No.: US 6,646,750 B1
(45) Date of Patent: Nov. 11, 2003

(54) METHOD AND ARRANGEMENT FOR MEASURING THE STRUCTURES OF AN OBJECT

(75) Inventor: Ralf Christoph, Schöffengrund (DE)

(73) Assignee: Werth Messtechnik GmbH, Giessen (DE)

(*) Notice: Subject to any disclaimer, the term of this patent is extended or adjusted under 35 U.S.C. 154(b) by 0 days.

(21) Appl. No.: 09/646,909

(22) PCT Filed: Apr. 10, 1999

(86) PCT No.: PCT/EP99/02570
§ 371 (c)(1),
(2), (4) Date: Jan. 3, 2001

(87) PCT Pub. No.: WO99/53269
PCT Pub. Date: Oct. 21, 1999

(30) Foreign Application Priority Data

Apr. 11, 1998 (DE) .................................. 198 16 272

(51) Int. Cl.⁷ .............................................. G01B 11/24
(52) U.S. Cl. ..................... 356/609; 33/503; 33/559; 356/601

(58) Field of Search .................................. 356/609, 601; 33/503, 559

(56) References Cited

U.S. PATENT DOCUMENTS

| | | | |
|---|---|---|---|
| 5,144,150 A | | 9/1992 | Yoshizumi et al. |
| 5,615,489 A | * | 4/1997 | Breyer et al. ............... 33/503 |
| 6,240,651 B1 | * | 6/2001 | Schroeder et al. ........... 33/503 |

FOREIGN PATENT DOCUMENTS

| | | | |
|---|---|---|---|
| DE | 297 10 242 | * | 9/1997 |
| WO | 97/03346 | | 1/1997 |

* cited by examiner

Primary Examiner—Richard A. Rosenberger
(74) Attorney, Agent, or Firm—Dennison, Schultz & Dougherty

(57) ABSTRACT

The invention relates to a method and an arrangement for measuring the structure of an object. The structure is scanned by touch, by means of a scanning element whose position is optically detected. The force produced after the contact between the scanning element and the object is determined and optionally adjusted to constant values.

19 Claims, 1 Drawing Sheet

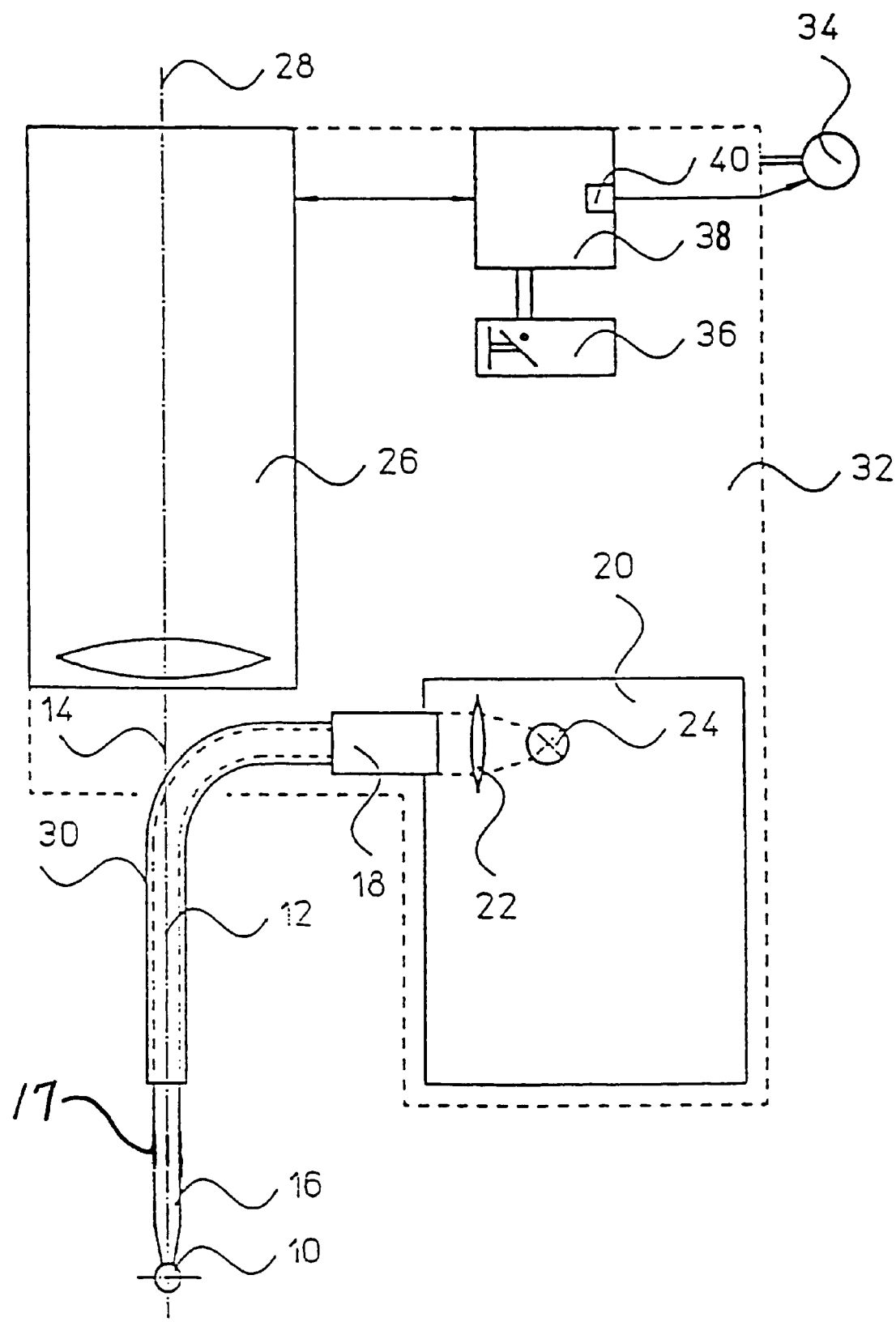

METHOD AND ARRANGEMENT FOR MEASURING THE STRUCTURES OF AN OBJECT

FIELD OF THE INVENTION

The invention relates to a method and an arrangement for measuring the structures of an object with the help of a scanning element that is allocated to a coordinate measuring device and that starts from a flexible shaft, with the scanning element touching the object and with its position being then determined directly or indirectly with at least one reticle, which is allocated to the scanning element, with an optical sensor.

BACKGROUND OF THE INVENTION

An arrangement of the kind described above is already known (DE 297 10 242 U1). In this familiar arrangement, surface topography of an item or object is measured with a photogrammetry system and the scanning element. The scanning element, e.g. a ball, is arranged at the end of an elastic shaft. In the shaft reticules can be incorporated, whose positions are recorded by the photogrammetry system relative to a tracer reference system. The position of the scanning element is determined e.g. by the reticle positions.

We also know of a measuring system for recording surface topography of objects with a data transmitter, which consists of a tracer pin and a light source of a defined kind at its end. The light source is guided along the outline that is to be recorded. In this method, an optical receiver records the respective position of a light source, which forms a luminous spot or light spot, in a three dimensional Cartesian coordinate system. A computer evaluates the measurement results. As an extension of the tracer pin, the light source takes on the shape of e.g. a concentrically enclosed glass fiber (DE 40 02 043 C2).

We furthermore know of a scanning system for measuring small structures, which is based on quartz crystal that stimulates a glass fiber with scanning element. When it touches the surface of the item, the dampening of the system is evaluated. Although this technique enables small scanning forces, it is subject to a relatively high degree of inaccuracy (measurement error 5 $\mu$m).

And finally, for the purpose of measuring structures, we are familiar with the method of determining the position of a scanning element with the help of a microscope; for this method, a transmission procedure must be applied due to the equipment so that only structures of through-holes or other perforations can be measured.

SUMMARY OF THE INVENTION

The invention at issue is based on the problem of developing a method and a device for measuring surface topography of objects with which any random structure and object of varying surface hardness can be determined with a high degree of measurement exactness.

According to the invention, a method for measuring the structures of an object solves the problem with a scanning element that is allocated to a coordinate measuring device and that starts from a flexible shaft and touches the object and whose position is then determined directly or indirectly with at least one reticle, which is allocated to the scanning element, with a sensor in such a way that, with the exception of a free bending length comprising the scanning element and/or the reticule, the shaft runs within a rigid or basically rigid guiding piece and that the scanning force, which occurs upon contact between the scanning element and the object, is determined from the excursion of the scanning element and/or reticule from a neutral position. In doing so, particularly the scanning force is set to a value that has been adjusted to the properties of the object, due to the specification of the bending length. This can occur through shifting of the shaft within the guiding piece. The scanning force values obtained this way can then be taken into consideration in subsequent measurements of the object's structures.

In the case of some objects, the scanning force has considerable influence on the measuring results. In the invented method, it is possible to adjust the scanning force to the properties of the object, such as surface topography and surface hardness, as a parameter of the measurement.

In a preferred version, the scanning force of the scanning element is determined based on the following equation:

$$F = \frac{3 \cdot E \cdot f \cdot I}{l^3}$$

wherein F describes the scanning force, E the modulus of elasticity of the shaft, l the effective bending length of the shaft between the rigid guiding piece and the scanning element, I the axial surface moment of the shaft, and f the excursion of the latch element from a neutral position. The modulus of elasticity, axial surface or inertia moment and length are specified by the design or material properties of the device and can be summarized into one constant. This makes the scanning force proportional to excursion and it can be determined quickly and without extensive arithmetical operations and time.

If necessary, the shaft can be moved within the guiding piece in order to modify the effective bending length. Apart from this, the rigid guidance of the shaft ensures in a constantly reproducible manner that the shaft has a defined bending length.

In a useful version, the scanning force is adjusted as a controlled variable in a control circuit to a specifiable constant or nearly constant value, with the support of at least one motor being moveable in the form of an actuator. The scanning force in this version can be maintained at a specified value throughout the entire measuring process of the structure. For measuring the surface topography in three dimensions, it has frequently proven useful if the support can be moved by drives in five degrees of freedom with the elastic shaft connected to it. For this purpose, numerical control circuits are suited. In particular, the support is connected with the adjusting mechanism for the optical system into one unit, which can be adjusted with a motor into five degrees of freedom.

Furthermore it is beneficial when the scanning element's excursion is measured with an optical sensor, which records the difference between the scanning element's position when it is in neutral position and the scanning element's position when it touches the surface of the object. It is useful if the sensor, which is the same as the one used for measuring the structure, moves together with the support.

The position of the scanning element and/or of the at least one reticule is determined optically especially with reflective radiation and/or radiation shutting off the element or reticule and/or reflecting from the scanning element. It is useful if the tracer extension or the shaft are a fiber-optic light guide or comprise such a light guide in order to feed the required light to the scanning element or the reticule via this light guide.

It is also possible that the scanning element and/or the reticule have the design of a self-luminescent electronic element such as LED or comprise such a component.

In particular, the invention excels through an arrangement for measuring the structures of objects with the help of a scanning element that is allocated to a coordinate measuring device and that starts from a flexible shaft and can be brought into contact with the object and whose position can then be determined directly or indirectly with at least one reticule, which is allocated to the scanning element, with a sensor, with the arrangement excelling through the fact that the shaft, with the exception of a free bending length comprising the scanning element and/or the reticule, runs in a rigid or basically rigid guiding piece. This specifies the scanning force, defined by the effective bending length, which makes the arrangement adjustable to the conditions of the surface properties of the object that is to be measured.

In particular, the arrangement excels through the fact that a sensor is provided for measuring the excursion of the scanning element and/or of the reticule from a neutral position, that the shaft—with the exception of a free bending length comprising the scanning element and/or the reticule—is run in a rigid or basically rigid guiding piece, that the guiding piece can be moved relative to the object's surface together with the shaft with at least one motor and that with an evaluating device the scanning force can be determined from the excursion of the scanning element and/or the reticule from the neutral position. With this device, the scanning force of the scanning element can be adjusted to the conditions of the surface properties of the object. For example, the scanning force can thus be adjusted to the hardness properties of the surface, achieving as high a degree of measuring accuracy as possible. This allows the possibility of arranging the shaft in a moveable fashion within the guiding piece.

In particular, the arrangement determines the scanning force from the measurement value of the scanning element's excursion based on the following equation:

$$F = \frac{3 \cdot E \cdot f \cdot I}{l^3}$$

wherein F describes the scanning force, f the excursion, l the length of the shaft in its effective bending length, E the modulus of elasticity of the shaft and I the axial surface moment of the shaft. Since all values in this equation except for the excursion f and the scanning force are constant, the excursion can be calibrated while taking the constant in the unit of the scanning force into consideration.

In a useful version, an optical system is provided for recording the scanning element's or the reticule's excursion from a neutral position, and it can be moved as a unit with at least the scanning element and the shaft. The system, with which particularly also surface topography is determined, allows determination of the neutral position taken on by the scanning element and/or by the at least one reticule or several reticules if no contact with the object or item occurs. The appropriate geometrical position of the scanning element or of the at least one reticule can be memorized and appropriately adjusted when the system changes its position. When the scanning element touches a surface of the object, the difference between the neutral position and the position upon contact is recorded, e.g. from the scanning element's position and the allocated neutral position. In particular, the optical system for recording the scanning element's or reticule's excursion is arranged as an actual value transmitter in a control circuit, whose controlled variable is the scanning force and which, as the actuator, comprises at least one motor for movement of the unit, which includes the scanning element, the shaft and the sensor. The scanning element can be attached to the shaft by way of gluing, welding or other suitable fastening procedures. The scanning element and/or the reticule itself can also be a section of the tracer extension.

At the ends, the shaft itself can have the design of a tracer or comprise a tracer. In particular, the scanning element and/or the reticule can be connected with the tracer extension as well as the shaft in an exchangeable manner.

In order to be able to determine nearly any random structure, the invention furthermore incorporates the feature that the scanning element with the shaft and the optical system can be adjusted by a support that can be set in five degrees of freedom. The support itself in turn can form a unit with the sensor and/or be connected with the sensor. In a preferred version, the scanning element and the shaft represent a fiber-optic light guide, with the scanning element being fed light via the light guide. In this version, the scanning element, which is recorded as a luminous spot or light spot by the optical system, radiates. The scanning element and/or the at least one reticule can also have a reflective design. However, there is also the possibility of designing the scanning element and/or the reticule as a self-luminescent element such as LED.

In particular, the optical system, which is employed to detect the excursion of the scanning element from its neutral position and for measuring structure, is an electronic camera. Measurement of the excursion is performed in particular also with a focus system, as is the one already known in optical coordinate technology for focusing on the object surface. In this version, the contrasting function of the image is evaluated in the electronic camera.

For the purpose of determining the structure of objects, the scanning element's position is measured directly. Many different physical principles are possible for this direct measuring procedure. Since spatial measurement of the scanning element's excursion in a large measuring range must be very precise, e.g. in order to enable continuous scanning processes, and in order to absorb excessive object scanning (e.g. for safety reasons, but also in order to reduce the efforts required for exact positioning), a photogrammetrical procedure can be employed as well. Two camera systems with axes tilted towards each other could be used for this. Evaluation techniques known from industrial photogrammetry could be utilized.

Any measuring task, where the scanning element does not "disappear" behind undercuts, can be resolved with two tilted cameras that e.g. "face" the scanning element lengthwise or the ends of a tracer extension and shaft facing the scanning element. Employing a redundant number of cameras (e.g. three) also enables the measurement of objects with steep outlines. For the purpose of measuring in small bores, a camera can be employed that is arranged in such a way that it "looks onto" the scanning element either in the scanning element's or the tracer extension's lengthwise direction. Generally a single camera, which has been aligned to the lengthwise direction of the tracer extension and shaft fastening the scanning element, is sufficient for two-dimensional measurement (also e.g. when measuring in bores).

According to the invention it is also possible to attach additional illuminated balls or other reticules on the shaft, which has the design of a fiber-optic light guide, record the position of these reticules especially photogrammetrically and to calculate the excursion of the scanning element accordingly. Balls represent a quite ideal, clear reticule, which one cannot find otherwise on the fiber. Good light coupling into the balls is achieved by disturbing the light guide properties of the shaft, e.g. by placing the bored volume-dispersing balls onto the shaft, i.e. the tracer extension, and gluing them onto the shaft. The volume-dispersing balls can also be glued to the side of the shaft, which also enables light coupling, provided that the shaft guides light all the way to its surface and is therefore not equipped with a casing in the glued area. A particularly high degree of precision is achieved when by trial the scanning element's position is recorded (calibrated) as a function of the fiber position and fiber deflection (zones of the fiber at a distance from the scanning element). Here as well, the measuring of reticules that have been placed along the fiber instead of measuring the fiber itself is possible.

Further details, advantages and features of the invention result not only from the claims and the features described in these claims—either on their own and/or in combination—but also from the following description of the preferred version shown in the drawing.

BRIEF DESCRIPTION OF THE DRAWING

FIG. 1 shows a diagrammatic view of an arrangement for recording surface topography or the surface structure or geometry of objects or items.

DETAILED DESCRIPTION OF THE INVENTION

The arrangement includes a scanning element 10, particularly a translucent ball. The scanning element 10 is connected with a shaft 12, a light guide, in the form of optical fibers. The shaft 12 runs in a rigid casing 14 or sleeve with a first section, which is not described in detail. The sleeve 14 sets the position of this section. A second section 16 of the flexible shaft 12 protrudes from the sleeve 14 and is equipped with the scanning element 10 at its end. The length of the section 16 determines the effective bending length of the shaft 12. This way, the bending length can be changed in a specific way by shifting the shaft within the sleeve 14. Of course the length of the section 16 can be specified e.g. with metrology or equipment so that it cannot be adjusted.

At its end facing away from the section 16, the sleeve 14 is fastened in a support 18, which is connected with a housing 20. In the housing 20 a lens 22, with which the light that is sent from a light source 24 is fed into the shaft 12, is located in front of the end of the shaft (not shown). A unit 26, which contains an optical system that is not defined in detail for the purpose of measuring the position of the scanning element 10, is connected with the housing 20. For the purpose of recording the position of the scanning element 10, a device can be used that is basically known and also used for structure measurement. The position of the scanning element 10 can be determined with a sensor, e.g. an electronic image processing system such as an electronic camera. The position of the scanning element 10 can also be recorded upon its contact with the measurement object, by evaluating a contrasting function of the image with an electronic camera. Another possibility is to determine the position the scanning element 10 upon contact with the measurement object from a change in value of the image of at least one reticule 17, which is arranged on the shaft 12. The change in value results from the radiation-optical connection between the object distance and the increase.

The position of the scanning element 10 can also be determined from the apparent change in value of the reticule, which arises from the contrast loss due to defocusing. In this version, the position is determined upon contact of the scanning element and the object in comparison to the optical axis 28 of the image processing system or electronic camera or alternatively with a photogrammetrical system.

Upon contact between the scanning element 10 and the object, a force is generated that influences the measurement results. In order to achieve exact measurement, this scanning force is adjusted to the conditions of the object, e.g. surface hardness, surface roughness, etc. The scanning force is measured first. Measurement of the scanning force is conducted by recording the excursion or deflection of the section 16 of the shaft 12. The extent of the excursion is determined by the difference between the position of the scanning element 10 in neutral position, which is shown in the drawing, and the position upon contact between the scanning element and the object. For this, the idea of the invention that the shaft 12 can only be bent over a defined length, i.e. the section 16 that protrudes over the sleeve 14, is employed.

The scanning force F is determined based on the following equation:

$$F = \frac{3 \cdot E \cdot f \cdot I}{l^3}$$

wherein l=the length of the section 16, i.e. the free fiber, f= deflection (excursion of the scanning element 10 from the neutral position), E=modulus of elasticity of the shaft 12 or sectionl 16 and I=axial surface moment of the shaft 12 or section 16.

The neutral position of the scanning element 10 is measured with the optical system of the unit 26. The section 16 and a portion 30 of the rigid sleeve 14 run lengthwise along the optical axis 28. The sleeve 14 is angled or bent. The other angled portion of the sleeve 14, which is not described in detail, is fastened to the sleeve 18 at its end.

The housing 20 with the light source 24 and the lens 22 is arranged with the unit 26 on a joint support 32, which is only shown in diagrammatic view. The support 32 can be adjusted in at least three directions of the Cartesian coordinate system with a motor. The support can be adjusted in five degrees of freedom in a preferred version.

When adjusting the support 32 in the space, i.e. when changing the orientation of the optical axis 28, the position of the scanning element 10 in neutral position, which corresponds to this position of the axis in the space, is calculated.

When the scanning element 20 touches a surface of the object, the optical system of the unit 26 determines the scanning force based on the above-mentioned equation from the value of the excursion of the scanning element 10.

Since with the exception of the scanning force and the excursion all values of the equation are constant, the scanning force of the excursion is proportional, which allows quick and easy determination of the scanning force. Excursion of the scanning element 10 is used in connection with the spatial position of the support 32 not only for measuring surface topology, but also for measuring the scanning force.

The scanning force can be shown on a display. The scanning force can be adjusted to desired values by changing the position of the support 32 with one or more motors, which are shown symbolically in the drawing as a single motor 34.

The measured scanning force is fed to a comparator in a control circuit as the actual value of the controlled variable, whose target value is adjusted with an input unit 36. The control circuit comprises a computer 38, which determines the actual value of the controlled value from the calculated neutral position of the scanning element 10 in the space relative to the respective position of the optical axis in the space and the measured excursion and which determines the standard deviation based on the target value. The computer 38 issues setting signals to the motor 34 via a trigger switch 40. These controls serve the purpose of keeping the scanning force at a constant or nearly constant value. This depends on the selected control algorithm. The scanning force is thus adjusted to the conditions of the measurement object and maintained throughout the measuring process of the structure. The extent of scanning force that is selected is dependent upon the surface topology and surface hardness of the measurement object.

The scanning element 10 used for determining the scanning force is the same as that used for measuring surface topography.

The rigid casing 14 or sleeve is preferably made of metal.

When measuring the structures of objects that have a low material hardness or elastic surface properties, the scanning force is set for low values, which allows the scanning force to have only little influence on measuring precision.

What is claimed is:

1. Method for measuring the structures of an object with a scanning element of a probe that is allocated to a coordinate measuring device and that starts from a flexible shaft of said probe, with the scanning element being brought into contact with the object and then its position being determined with and optical sensor directly or indirectly via at least one reticule, which is allocated to the scanning element, with an optical sensor, characterized by the fact that the shaft, with the exception of a free bending length that comprises the scanning element and/or the reticule, runs within a rigid or basically rigid guiding piece and that the scanning force, which occurs upon contact between the scanning element and the object, is set to a value that has been adjusted to the conditions for the object by specifying the bending length.

2. Method in accordance with claim 1, characterized by the fact that the shaft is arranged within the guiding piece in a moveable fashion.

3. Method in accordance with claim 1, characterized by the fact that the scanning force of the scanning element is determined based on the following equations:

$$F = \frac{3 \cdot E \cdot f \cdot I}{l^3}$$

wherein F describes the scanning force, E the modulus of elasticity of the shaft, l the free effective bending length of the shaft outside the guiding piece, I the axial surface moment of the shaft, and f the excursion of the scanning element from its neutral position.

4. Method in accordance with claim 1, characterized by the fact that the scanning force is set as a controlled variable in a control circuit to a specifiable constant or nearly constant value and that the support is moved by at least one motor as actuator.

5. Method in accordance with claim 1, characterized by the fact that the excursion of the scanning element is measured with an optical sensor, which records the position of the scanning element in its neutral position and the position of the scanning element upon contact with the surface of an object.

6. Method in accordance with claim 1, characterized by the fact that the position of the scanning element and/or of at least one reticule is determined with reflective radiation and/or radiation shutting off the element or reticule and/or reflecting from the scanning element.

7. Method in accordance with claim 1, characterized by the fact that the neutral position of the scanning element is measured in a specified position of the optical sensor, that the neutral positions of the scanning element in positions deviant from these positions of the optical sensor are determined from the specified position and the change in position of the optical sensor and that the position of the scanning element upon contact with the object is measured with the optical sensor and the measurement values for the structure of the object and determination and excursion of the scanning force are processed.

8. Arrangement for measuring the structures of an object, with scanning element (10) that is allocated to a coordinate measuring device, that starts from a flexible shaft (16), that can be brought into contact with the object whose position can then be determined with an optical sensor indirectly or directly with at least one reticule, which is allocated to the scanning element, characterized by the fact that the shaft (12), with the exception of a free bending length (16) comprising the scanning element (10) and/or the reticule, runs within a rigid or basically rigid guiding piece (30).

9. Arrangement in accordance with claim 8, characterized by the fact that a sensor is provided for measuring the excursion of the scanning element and/or the reticule from a neutral position, that the scanning element and the elastic shaft can be moved, together with the guiding piece (30), relative to the surface of the object that is to be measured by at least one motor (34) and that the scanning force can be determined with an evaluating unit from the value of the excursion of the scanning element and/or the reticule from the neutral position.

10. Arrangement in accordance with claim 9, characterized by the fact that in this arrangement the scanning force is determined from the value of the excursion based on the following equation:

$$F = \frac{3 \cdot E \cdot f \cdot I}{l^3}$$

wherein F describes the scanning force, f the extent of excursion from the neutral position, l the length of the elastic shaft (12) between the scanning elements (10) and a rigid sleeve (30), E the modulus of elasticity of the shaft (12) and I the axial surface moment of the shaft (12).

11. Arrangement in accordance with claim 9, characterized by the fact that an optical system is provided for recording the excursion of the scanning element (10) or the at least one reticule from a neutral position and can be moved at least with the scanning element (10) and the shaft (12) as one unit.

12. Arrangement in accordance with claim 11, characterized by the fact that the optical system for recording the excursion of the scanning element is arranged in a control circuit, whose controlled variable is the scanning force and which, as an actuator, is equipped with at least one motor for moving the unit containing the scanning element, shaft and sensor.

13. Arrangement in accordance with claim 12, characterized by the fact that the scanning element (10) can be adjusted together with the shaft (12) and the optical system with a support that can be set to five degrees of freedom.

14. Arrangement in accordance with claim 11, characterized by the fact that the optical system for determining the excursion of the scanning element (10) is an electronic camera or a focusing system.

15. Arrangement in accordance with claim 11, characterized by the fact that the optical system for recording the excursion of the scanning element (10) from the neutral position is also provided for measuring the structure of the object.

16. Arrangement in accordance with claim 11, characterized by the fact that a computer is provided for calculating the position of the scanning element relative to the position of the optical system when measuring the neutral position of the scanning element and when changing the position of the optical system in the space.

17. Arrangement in accordance with claim 9, characterized by the fact that the scanning element (10) and the shaft (12) are fiber-optic light guides and that the scanning element (10) can be fed light via the light guide.

18. Arrangement in accordance with claim 9, characterized by the fact that the shaft (12) is run or held in a rigid guiding piece such as a sleeve (14) and that the effective bending length of the shaft is determined by its front section (16), which runs outside the guiding piece and contains the scanning element (10).

19. Arrangement in accordance with claim 18, characterized by the fact that the shaft (12) can be moved within the guiding piece (14).

\* \* \* \* \*